Feb. 5, 1935. F. RUDY, JR 1,990,390
HEADLIGHT LENS
Filed Oct. 4, 1933
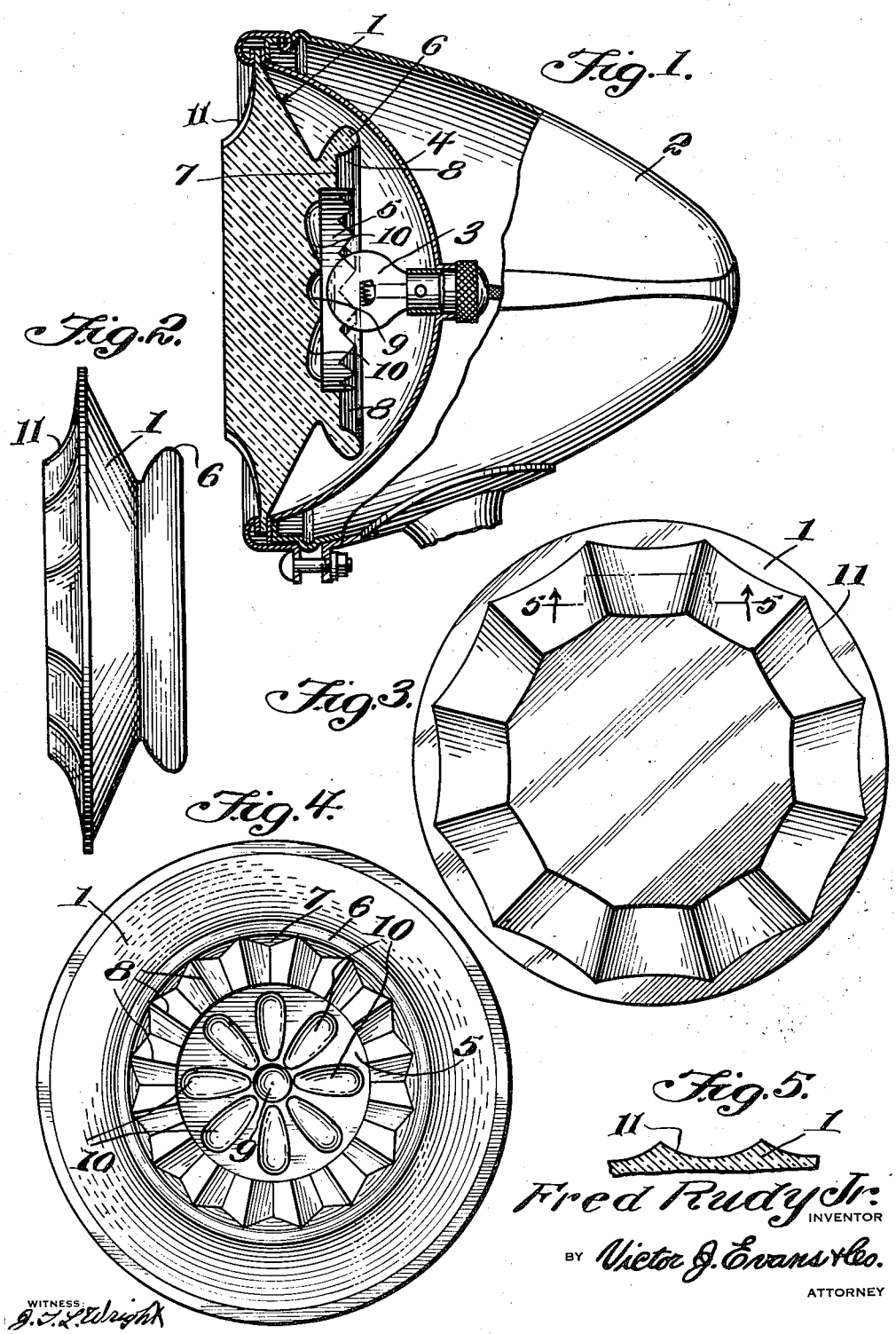

Patented Feb. 5, 1935

1,990,390

UNITED STATES PATENT OFFICE 1,990,390

HEADLIGHT LENS

Fred Rudy, Jr., Glenview, Ky.

Application October 4, 1933, Serial No. 692,157

1 Claim. (Cl. 240—41.4)

This invention relates to lenses for headlights and has for the primary object the provision of a device which will effectively diffuse light rays so that efficient and soft light rays may be had for the illumination of the roadway free of undesirable glare.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a lens constructed in accordance with my invention and showing the same applied to a headlight.

Figure 2 is a side elevation illustrating the lens.

Figure 3 is a front elevation illustrating the same.

Figure 4 is a rear elevation illustrating the same.

Figure 5 is a detail sectional view taken on the line 5—5 of Figure 3.

Referring in detail to the drawing, the numeral 1 indicates a lens mounted to a headlight 2 of a conventional construction wherein the electric lamp 3 is located centrally of the reflector 4. The lens overlies the reflector and its central portion is of an increased thickness in which is formed a recess or pocket 5 receiving a portion of the electric lamp 3. The thickened portion of the lens also provides a flange or rim 6 surrounding the recess 5 and spaced therefrom forming a recess 7 lying between the flange 6 and the recess 5. The walls of the recess 7 are fluted, as shown at 8, and the innermost wall of the recess 5 has a recess 9 and a series of radially arranged recesses 10 grouped about the recess 9 for forming a fluted surface to the inner wall of the recess 5 so that the light rays shining directly from the electric lamp 3 will be perfectly diffused.

The outer face of the lens between the thickened portion and the periphery of the lens is provided with a series of annularly arranged flutes 11 for the purpose of diffusing the light rays passing through the lens between the thickened portion and its periphery. With the fluted arrangement of the lens as heretofore described and with the electric lamp extending into a recess of the lens having walls thereof fluted will completely diffuse the light rays and the light thus obtained from the headlight will be efficient illumination for the road without undesirable glare.

While I have shown and described the preferred embodiment of my invention, it will be understood that minor changes in construction, combination and arrangement of parts may be made without departing from the spirit and scope of my invention, as claimed.

Having described the invention, I claim:

A headlight lens comprising a transparent panel having a thickened portion providing a projection upon one face of the panel, said projection having a recess to receive a portion of an electric lamp of a headlight, said projection defining an annular rim spaced from the recess and forming a second recess of a less depth than the first-named recess, certain walls of said recesses having flutes for diffusing light rays, the flutes of one recess being radially disposed and the flutes of the other recess being annularly arranged, the outer face of the panel between its periphery and the thickened portion having a series of annularly arranged flutes for diffusing light rays.

FRED RUDY, Jr.